Patented Apr. 4, 1939

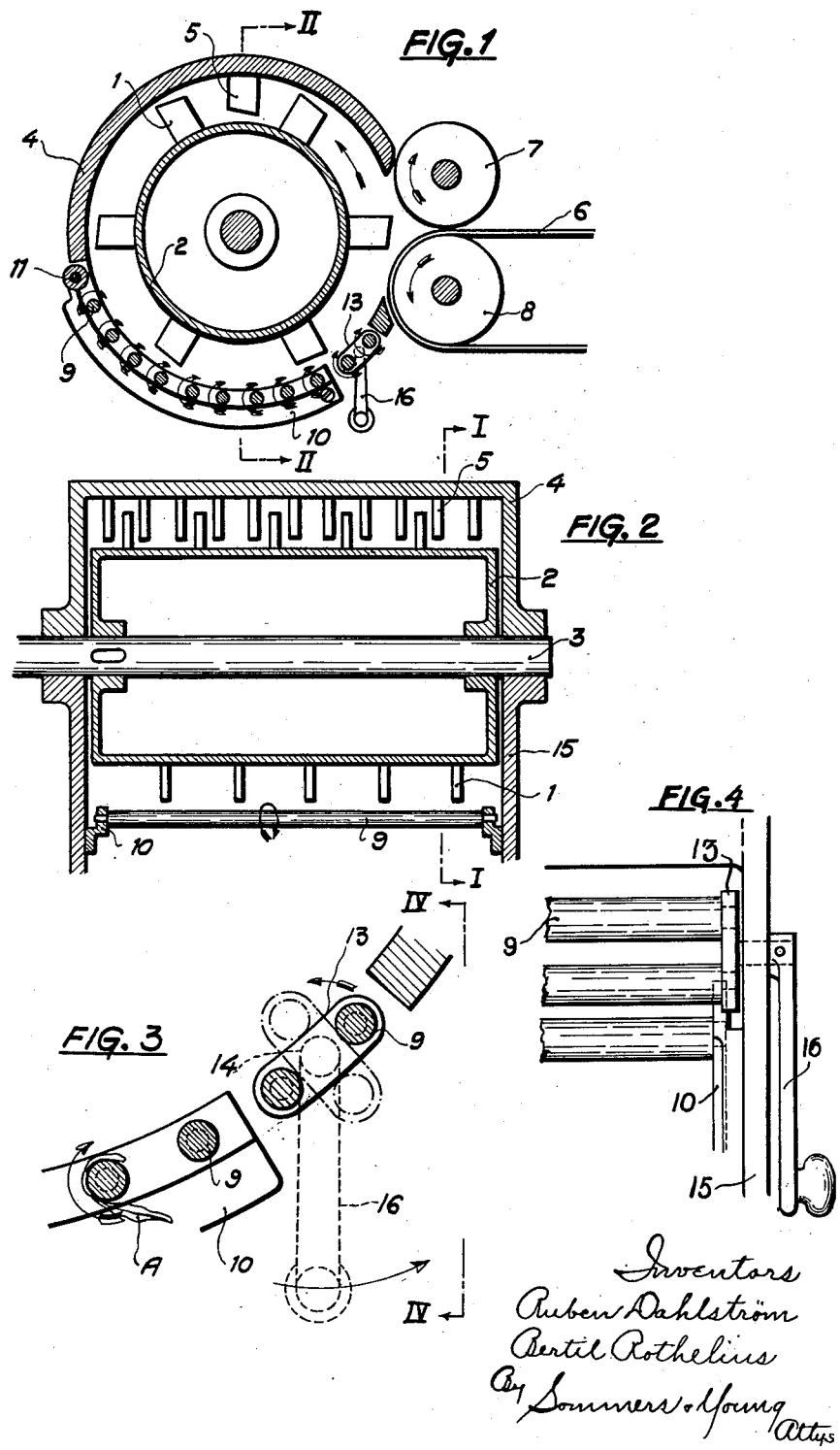

2,152,791

UNITED STATES PATENT OFFICE 2,152,791

DEVICE FOR DISINTEGRATING TOBACCO LEAVES

Ruben Dahlström, Alsten, and Bertil Rothelius, Stockholm, Sweden, assignors to Aktiebolaget Formator, Stockholm, Sweden, a joint-stock company of Sweden Application October 26, 1936, Serial No. 107,674 In Sweden October 25, 1935

9 Claims. (Cl. 131—60)

(Granted under the provisions of sec. 14, act of March 2, 1927; 357 O. G. 5)

This invention relates to a device for disintegrating tobacco leaves and for separating soft leaf parts from the stiff stems, and more particularly a device of such kind having a toothed rotatable leaf breaker.

In hitherto known devices of the kind referred to, a grating for the discharge of disintegrated leaf parts has been used which forms a bottom of a disintegrator chamber in which operates a toothed rotary cylinder for breaking the tobacco leaves. The size of the openings of said grating determines the size of the disintegrated leaf parts discharged from said chamber. However, the leaf parts, when being thrown in an oblique direction against said grating, have a tendency to embrace the edges of said openings and stick thereto and to form increasing layers of tobacco which narrow said openings. As a result leaf parts of a uniform desired size will not be discharged, but the size of the leaf parts decreases during the course of operation and, moreover, the capacity of the entire device is decreased. This necessitates repeated interruptions of the operation of the device for opening the device and cleaning the grating.

It is a main object of the invention to make provisions for removing the drawbacks above mentioned.

Another object of the invention is to provide means to facilitate the discharge of soft and comparatively long disintegrated leaf parts from the disintegrator chamber without at the same time discharging the relatively stiff parts, such as the stems.

Still another object of the invention is to provide means for the removal from the disintegrator chamber of waste and stem parts accumulated in said chamber on account of improved discharge of pure leaf parts.

Further objects of the invention will appear from the following description when read in combination with the accompanying drawing showing an illustrative embodiment of the invention and wherein:

Fig. 1 is a cross sectional view of the device on the line I—I of Fig. 2;

Fig. 2 is a longitudinal sectional view of the same device on the line II—II of Fig. 1;

Fig. 3 illustrates on an enlarged scale a detail of said device;

Fig. 4 is an end view in the plane of the line IV—IV of Fig. 3.

Referring to the drawing, a breaker cylinder 2 is provided with radially projecting teeth 1 and secured to a rotary shaft 3. The cylinder 2 is covered by a casing 4 which has a row of inwardly projecting teeth 5 between which the teeth 1 pass during the rotation of the cylinder 2. Tobacco leaves are supplied on an apron 6 and are fed between two rollers 7 and 8 which are driven in the direction of the arrows. The tobacco mass thus introduced is disintegrated by the coacting teeth 1 and 5. As the teeth of the breaker force the leaves through the row of teeth 5, the soft parts of the leaves are at least partially torn or loosened from the stem parts, and the stems are subjected to a combing action which places them in peripherally extending direction. Also this disintegrating action squeezes out some of the juice of the leaves. The cage enclosing the breaker cylinder and formed by the casing 4 and the frame 15 has at its bottom a lattice consisting of rods 9, which extend longitudinally of the cylinder 2, so that the lattice has a plurality of longitudinal slots formed between said rods. The rods 9, which have a circular cross section, are rotatably journalled in frames 10 which can be swung down about a pin 11. Possibly, the rods may have another cross sectional shape, for instance square. While the rods 9 are loosely journalled, as illustrated, they may possibly be rotated in a direction opposite to that of the breaker cylinder 2 by any suitable driving means, such as a friction belt or a gearing not shown. Forwardly of the frame 10, considered in the rotary direction of the breaker cylinder 2, is arranged a gate device for discharging stem parts or other waste. The discharge gate device comprises a short arm 13 which supports two loosely journalled rods 9 similar to those supported by the frame 10 and which, in normal operation, constitute part of the lattice. The arm 13 is secured to a pin 14 which is journalled in the frame 15 and rigidly connected to a crank 16.

When the disintegrated tobacco mass is moved within the cage by the rotatable breaker cylinder 2 it is thrown out against the rods 9 and the soft leaf parts A, being moistened by the juice, tend to adhere to and embrace the rods, as shown in Fig. 3. As a result, the revolving tobacco mass acts as a driver which rotates the rods 9 by frictional action in the direction indicated by arrows in Figs. 1 and 3. The tobacco leaves adhering to the rods are thereby pulled free of the stiff stems which extend transversely of the rods, and the soft leaf parts drop through the longitudinal slots between said rods out of the disintegrator chamber. As the adjacent faces of the rods are moving oppositely, there is a tendency for the leaf portions adhering thereto to be loosened from the rods by contact with oppositely moving adjacent leaf parts. The rods are thereby kept substantially free of accumulations of leaf material and the spaces between the rods remain substantially unobstructed.

Since a certain separation of pure leaf parts from broken or unbroken stem parts and other waste is obtained, the stem parts, etc., have to be discharged from the disintegrator chamber by other means. To this end, the supply of tobacco leaves fed by the apron 6 and rollers 7 and 8 is temporarily interrupted and after the main part of pure leaf parts in the disintegrator chamber has been discharged through the lattice and while the breaker cylinder continues its operation the crank 16 is swung in the direction as indicated by an arrow in Fig. 3, so that the arm 13 together with the rods 9 mounted thereon occupy the position indicated in dash and dotted lines. Then the stem parts and waste leave through the open discharge gate device.

We claim:

1. In a device for disintegrating tobacco leaves and separating soft leaf parts from stems, a rotatable leaf breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, and a plurality of rotatable rods forming a lattice having slots extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device.

2. In a device for disintegrating tobacco leaves and separating soft leaf parts from stems, a rotatable leaf breaker member, leaf disintegrating members, outwardly projecting teeth arranged on said breaker member to pass between and in spaced relationship to said disintegrating members, said teeth and disintegrating members loosening the soft parts of the leaves from the stems and arranging the stems peripherally of the breaker, and a plurality of rods rotatably journaled at their ends and forming a lattice having slots extending longitudinally of the rotary axis of said breaker member, the loosened soft leaf parts tending to adhere to said rods, said rods being rotated by the tobacco mass in said device, whereby the rods tear the parts adhering thereto from the stems and discharge said parts between the rods, while the peripherally extending stems are retained in the device.

3. In a device for disintegrating tobacco leaves and separating soft leaf parts from stems, a rotatable leaf breaker member, leaf disintegrating members, outwardly projecting teeth arranged on said breaker member to pass between and in spaced relationship to said disintegrating members, said teeth and disintegrating members loosening the soft parts of the leaves from the stems and arranging the stems peripherally of the breaker, and a plurality of loosely journaled rotatable rods forming a lattice having slots extending longitudinally of the rotary axis of said breaker member, the loosened soft leaf parts tending to adhere to said rods, said rods being rotated by the tobacco mass in said device, whereby the rods tear the parts adhering thereto from the stems and discharge said parts between the rods, while the peripherally extending stems are retained in the device.

4. In a device for disintegrating tobacco leaves and separating soft leaf parts from stems, a rotatable leaf breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, and a plurality of rotatable cylindrical rods forming a lattice having slots extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device.

5. In a device for disintegrating tobacco leaves and separating soft leaf parts from stems, a rotatable leaf breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, a detachable frame positioned beyond said breaker member, and a plurality of rods rotatably journaled in said frame to form a lattice having slots extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device.

6. In a device for disintegrating tobacco leaves and separating soft leaf parts from stems, a rotatable leaf breaker member, a cage enclosing said breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, a plurality of rotatable rods forming a lattice having slots for the discharge of leaf parts extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device and a gate device for discharging stem parts, said gate device constituting part of said cage.

7. In a device for disintegrating tobacco leaves and separating soft leaf parts from stems, a rotatable leaf breaker member, a cage enclosing said breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, a plurality of rotatable rods forming a lattice having slots extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device, a gate device for discharging stem parts, and means for operating and adjusting said gate device from the outside of said cage when said device is in operation, said lattice and gate device forming part of said cage.

8. In a device for disintegrating tobacco leaves and separating soft leaf parts from stems, a rotatable leaf breaker member, a cage enclosing said breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, a plurality of rotatable rods forming a lattice having slots extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device, and a gate device rotatably mounted at the forward end of the lattice for discharging stem parts.

9. In a device for disintegrating tobacco leaves and separating soft leaf parts from stems, a rotatable leaf breaker member, a cage enclosing said breaker member, leaf disintegrating members, outwardly projecting teeth arranged on said breaker member to pass between and in spaced relationship to said disintegrating members, the interaction of the teeth and disintegrating members serving to loosen the soft leaf parts from the stems and to arrange the stems peripherally of the breaker member, a plurality of rotatable rods forming a lattice having slots extending longitudinally of the rotary axis of said breaker member, the soft leaf parts tending to adhere to the rods, the rods being rotated by movement of the tobacco mass in the device, whereby the rods tear the parts adhering thereto loose from the stems and discharge said parts through the lattice, while the stems which extend transversely of the rods are retained in the device, and a gate device for discharging stem parts, said lattice forming part of said cage, the gate device having rods constituting part of said lattice.

RUBEN DAHLSTRÖM.
BERTIL ROTHELIUS.